(12) United States Patent
Saito et al.

(10) Patent No.: US 7,770,046 B2
(45) Date of Patent: Aug. 3, 2010

(54) MANAGEMENT OF TIME INFORMATION WITHIN A PLURALITY OF EXECUTION SPACES

(75) Inventors: Shinya Saito, Tokyo (JP); Mariko Kitajima, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 649 days.

(21) Appl. No.: 11/687,746

(22) Filed: Mar. 19, 2007

(65) Prior Publication Data

US 2007/0288785 A1 Dec. 13, 2007

(30) Foreign Application Priority Data

Apr. 12, 2006 (JP) .............................. 2006-110315

(51) Int. Cl.
*G06F 1/24* (2006.01)
(52) U.S. Cl. ...................... 713/500; 713/400
(58) Field of Classification Search ................ 713/400, 713/500
See application file for complete search history.

(56) References Cited

U.S. PATENT DOCUMENTS

| | | | | |
|---|---|---|---|---|
| 3,932,847 A | * | 1/1976 | Smith ........................ | 713/400 |
| 5,530,846 A | * | 6/1996 | Strong ....................... | 713/400 |
| 6,138,243 A | * | 10/2000 | Mealey et al. .............. | 713/400 |
| 6,167,482 A | * | 12/2000 | Schmidt et al. ............. | 711/103 |
| 6,539,493 B1 | * | 3/2003 | Kohl ......................... | 713/600 |
| 6,711,693 B1 | * | 3/2004 | Golden et al. .............. | 713/400 |
| 7,349,512 B2 | * | 3/2008 | Rausch et al. .............. | 375/356 |
| 7,475,002 B1 | * | 1/2009 | Mann ......................... | 703/23 |
| 2004/0205368 A1 | | 10/2004 | Lange-Pearson et al. | |

FOREIGN PATENT DOCUMENTS

| | | |
|---|---|---|
| JP | 04163634 A | 6/1992 |
| JP | 09044425 A | 2/1997 |
| JP | 09218721 A | 8/1997 |
| JP | 2004054815 A | 2/2004 |
| JP | 2004318878 | 11/2004 |

OTHER PUBLICATIONS

Preliminary Rejection with Partial translation for corresponding Japanese Application 2006-110315.

* cited by examiner

*Primary Examiner*—Chun Cao
(74) *Attorney, Agent, or Firm*—Matthew B. Dernier, Esq.; Gibson & Dernier LLP

(57) ABSTRACT

An information-processing apparatus for executing processes in mutually independent execution spaces, the processes comprising a first process for managing time information and acquiring and providing clocked time information in accordance with a request; a second process for receiving a request for acquisition of time information, outputting the request to the first process, and acquiring and outputting provided time information; and a third process for outputting a request for acquisition of time information to the second process in accordance with a request from a request source, acquiring time information output by the second process, and providing the acquired time information to the request source.

11 Claims, 6 Drawing Sheets

FIG.4

| ID | DIFFERENCE INFORMATION |
|---|---|
| id | $\Delta T_{id}$ |
| id1 | $\Delta T_{id1}$ |
| ⋮ | ⋮ |

US 7,770,046 B2

MANAGEMENT OF TIME INFORMATION WITHIN A PLURALITY OF EXECUTION SPACES

CROSS-REFERENCE TO RELATED APPLICATIONS

The priority application No. JP 2006-110315 upon which this patent application is based is hereby incorporated by reference.

BACKGROUND OF THE INVENTION

1. Field of the Invention

The present invention relates to an information-processing apparatus that is capable of managing a plurality of execution spaces in computer systems and the like.

2. Description of the Related Art

Recent computer systems have come to be able to execute programs in parallel for each of a plurality of execution spaces. "Execution spaces" refers to logical program execution units, to which memory space, processors, and other resources necessary for program execution are logically and physically allocated.

As an example, a plurality of processor cores is provided in a processor. Each of the processor cores is capable of executing mutually independent instructions in parallel. Local memory corresponding to each processor core may also be provided. The processor cores execute programs stored in the correspondingly provided local memory. Execution spaces are divided according to each processor core and corresponding local memory.

When external resources (e.g., non-processor memory, input/output devices) are accessed in a computer system that executes programs in parallel for each of a plurality of execution spaces, a manager is provided to arbitrate access to the external resources from the programs executed in each execution space. Use of external resources is managed by this manager.

One of these external resources is a timer that is backed up by a battery. The timer holds time information, which is set by the computer system administrator, and keeps the time. The programs within each execution space can also acquire, via the manager, the time information kept by the timer.

However, different time information may need to be acquired for each execution space in instances such as when separate operating systems (system programs that manage input/output with peripheral devices, program execution, and the like) are executed for each execution space. A method that addresses such needs, and is disclosed in U.S. Patent Application No. 2004-0205368, is a system capable of correcting the time information kept by the timer and setting different times in each logical partition by using partition offsets set to different values with each logical partition, which is an example of an execution space.

However, with the technique disclosed in the aforementioned document, it is not always possible to rely on the corrected time kept in the timer. For example, with the technique disclosed in the document, one who is the administrator of an operating system run in a certain execution space, but who is not the administrator of the whole computer system, can exercise whole computer system administrator's rights to set the time of the timer.

SUMMARY OF THE INVENTION

The present invention was devised in view of the aforementioned circumstances, and one of its objects is to provide an information-processing apparatus capable of setting different time information for each execution space or process, and capable of executing a safe method of acquiring and correcting the time.

According to an aspect of the invention, there is provided an information-processing apparatus comprising: a time-retention unit for managing time information as well as acquiring and providing clocked time information in accordance with a request; a time-information acquisition unit for receiving a request for acquiring time information, outputting the request to the time-retention unit, and acquiring and outputting provided time information; and a time-information request unit for outputting a request for acquiring time information to the time-acquisition unit in accordance with a request from a request source, acquiring time information output by the time-acquisition unit, and providing the acquired time information to the request source, wherein the time-retention unit, the time-information acquisition unit, and the time-information request unit are implemented in mutually independent execution spaces.

BRIEF DESCRIPTION OF THE DRAWINGS

FIG. 4 is a descriptive drawing showing an example of difference information held by the information-processing apparatus according to an embodiment of the present invention;

DESCRIPTION OF THE PREFERRED EMBODIMENTS

Figure 1:
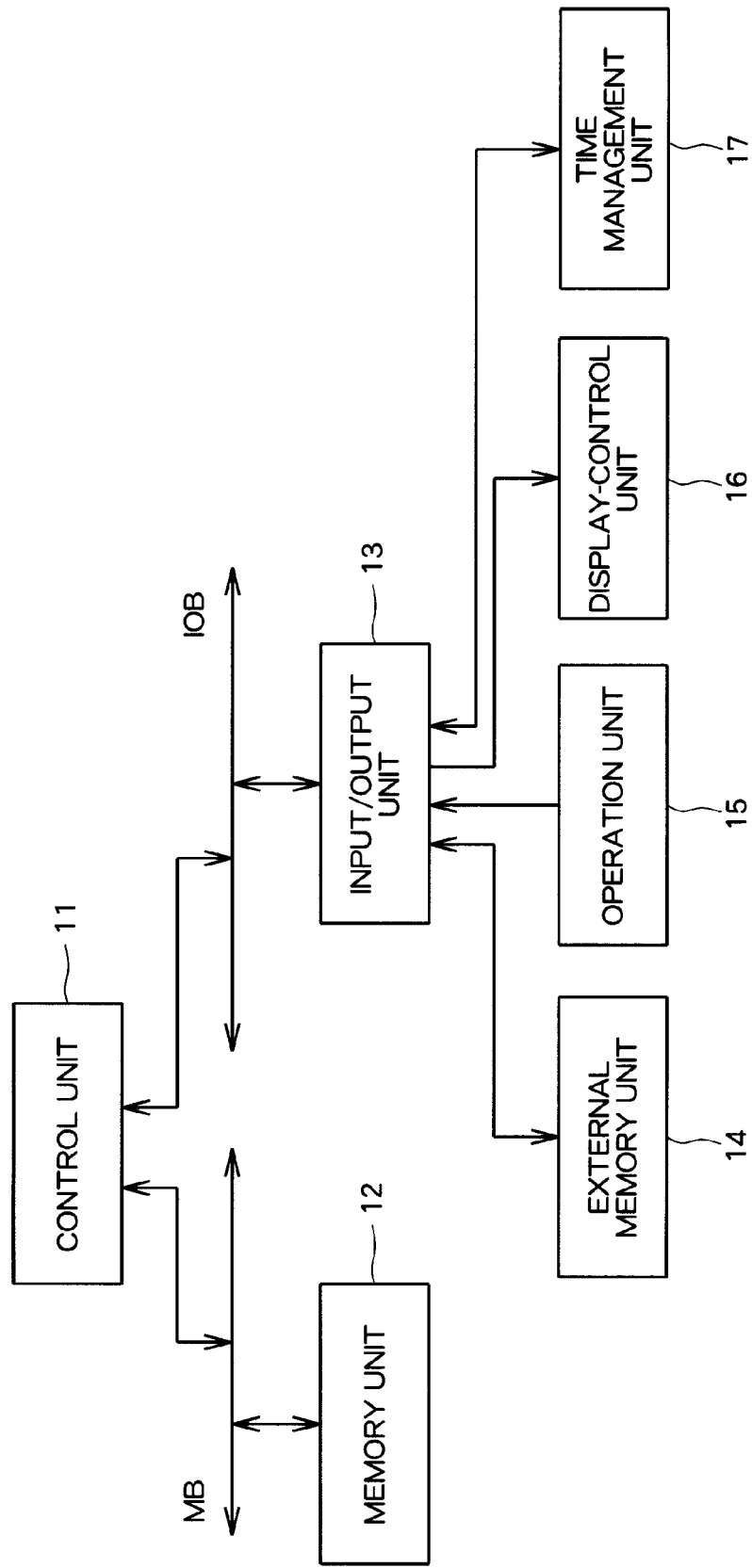
FIG. 1 is a structural block diagram showing an example of an information-processing apparatus according to an embodiment of the present invention.

An embodiment of the present invention will be described with reference to the drawings. An information-processing apparatus according to an embodiment of the present invention is, e.g., a personal computer, a game system for home use, or the like. The information-processing apparatus includes a control unit 11, a memory unit 12, and an input/output unit 13, as shown in FIG. 1. The control unit 11 and the memory unit 12 are connected by a memory bus MB, and the control unit 11 and the input/output unit 13 are connected by an input/output bus 10B. The input/output unit 13 is also connected to an external memory unit 14, an operation part 15, a display-control unit 16, and a time management unit 17.

Figure 2:
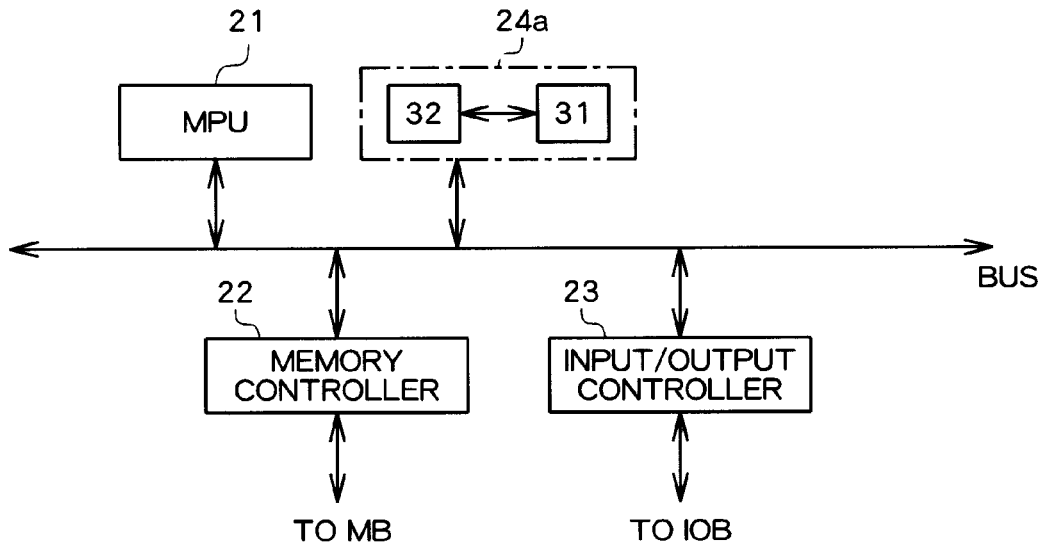
FIG. 2 is a structural block diagram showing an example of the control unit of the information-processing apparatus according to an embodiment of the present invention.

As shown in FIG. 2, the control unit 11 includes a main processing unit (MPU) 21, a memory controller 22, an input/output controller 23, and at least one sub-processor unit 24 (one sub-processor unit 24 is shown in FIG. 2), which are connected together by a processor bus (PB). Each sub-processor unit 24 has a local memory unit 31 and a secondary processing element (SP) 32.

The MPU 21 of the control unit 11 reads and executes, via the memory controller 22, individual instructions (commands included in programs) from programs that are stored in the memory unit 12. In the present embodiment, when the MPU 21 finds instructions to activate the sub-processor unit 24, the MPU 21 outputs a program load command to a sub-processor unit 24, and the sub-processor unit 24 is activated. The activation process of the sub-processor unit 24 will be described hereinafter.

The MPU 21 also executes the operating system (OS) and application programs in the present embodiment.

The memory controller 22 is connected to the memory unit 12 via the memory bus (MB). The memory controller 22 reads data from the memory unit 12, in accordance with data-read requests input from the MPU 12 or the sub-processor unit 24, and sends an output to the MPU 21, the sub-processor unit 24, or other request source. The memory controller 22 also writes data to the memory unit 12 in accordance with data-record requests input from the MPU 21 or the sub-processor unit 24.

The input/output controller 23 is connected to the input/output unit 13. The input/output controller 23 receives data-output instructions from the MPU 21 or the sub-processor unit 24. Once these instructions have been received, an output destination for the data is specified to the input/output unit 13 from among the external memory unit 14, the display-control unit 16, and the like in accordance with the instructions; and the data that serves as the object of the instructions is output to the input/output unit 13. If data from the external memory unit 14, the operation part 15, and the like is input from the input/output unit 13, the input/output controller 23 outputs the data to the MPU 21 or the sub-processor unit 24, which serve as the output destinations.

One sub-processor unit 24 has the local memory unit 31 and the secondary processing element 32. The local memory unit 31 is a memory element and operates as the main memory of the secondary processing element 32. The secondary processing element 32 is a program-execution element that reads from the memory unit 12 and operates in accordance with programs stored in the local memory unit 31.

The sub-processor units 24 each have independent execution spaces, and programs can be efficiently executed via inter-reference between the execution spaces performed as necessary.

At least one among the plurality of sub-processor units 24 in the present embodiment can operate as a security processor unit. The security processor unit has configuration capable of limiting access to its execution space from other units (the MPU 21, the other sub-processor units 24, and the like).

An example of a configuration capable of limiting access will be described below.

The security processor unit has authentication information. When the sub-processor unit 24 is operating as a security processor unit and the execution space thereof is accessed by other units, the accessing source is authenticated using the authentication information. If the authentication is successful, only access from the accessing source to the execution space of the sub-processor unit 24 is permitted. If the authentication fails, the sub-processor unit 24 rejects access to its execution space.

The security processor unit may also hold key information. Transmitted data may also be encrypted and decrypted using the key information during communication with an accessing source having access permission. Decrypted data is stored in the local memory unit 31. In such instances, a legitimate accessing source must hold key information corresponding to the key information held by the security processor unit.

The sub-processor unit 24 may be a processing unit that operates solely as a security processor unit, or may be a processing unit that usually operates as a simple processing unit, and only operates as a security processor unit when a specific command is received from the MPU 21.

The memory unit 12 has a RAM (random access memory) or other memory element and holds programs to be executed by the MPU 21 and the sub-processor unit 24 of the control unit 11. The memory unit 12 also operates as a main memory that holds the data necessary whenever the MPU 21 and the sub-processor unit 24 carry out processes.

The input/output unit 13 is a so-called bridge chip that selects the output destination of signals output from the control unit 11 (output signals) in accordance with directions input from the control unit 11, and that selectively outputs the output signals of the control unit 11 to the selected output destination. The input/output unit 13 also outputs signals input from the external memory unit 14, the operation part 15, and the like to the control unit 11.

The external memory unit 14 reads information recorded on a Blu-ray disc, DVD, or other external recording medium and sends an output to the control unit 11 via the input/output unit 13. The operation part 15 is a game controller, mouse, keyboard, or the like that is operated by a user and outputs the operational content to the control unit 11.

The display-control unit 16 is a graphics-processing board or the like that creates images in accordance with instructions input from the control unit 11, and causes the images to be displayed by outputting information having the created images to a display (e.g., a television used in domestic settings) that is connected to the outside.

Figure 3:
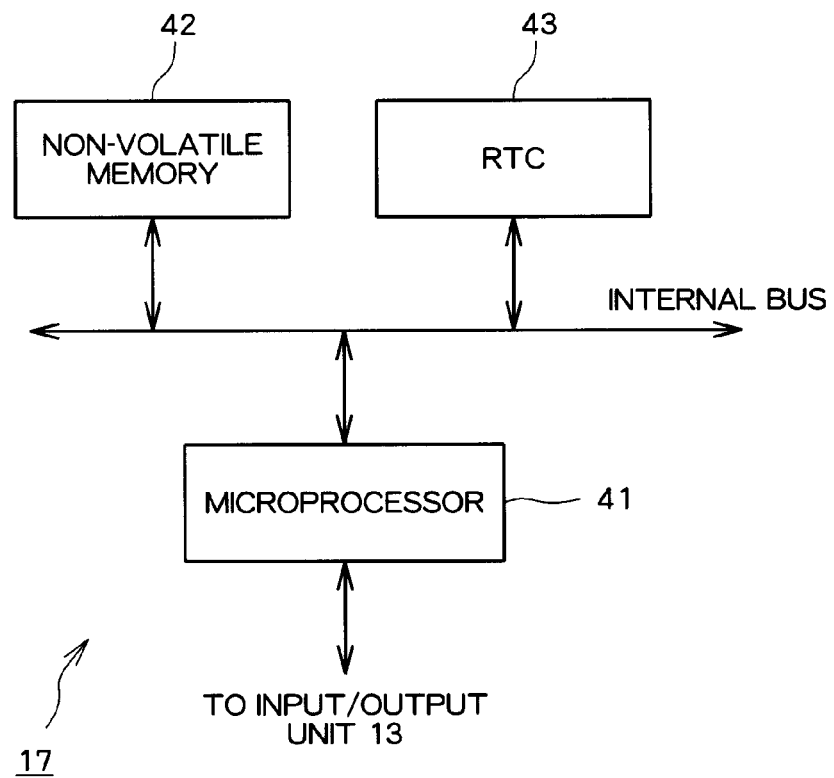
FIG. 3 is a block diagram showing an example of the time-tracking unit in the information-processing apparatus according to an embodiment of the present invention.

As shown in FIG. 3, the time management unit 17 has a microprocessor 41, a non-volatile memory 42, and a real-time clock (RTC) 43, which are inter-connected by a bus (intra-controller bus). The time management unit 17 may be mounted as tamper-resistant hardware. For example, the difference information held in the non-volatile memory 42 may be encrypted, and may be decrypted by the microprocessor 41 upon receipt. Memory chips whose content will be erased if the chip surface is exposed may also be implemented. Alternatively, the circuits may be configured to cease operation when a probe for reading signals is attached. Such tamper-resistant designs are well-known, and therefore detailed descriptions will be omitted herein.

The microprocessor 41 operates in accordance with programs stored in the built-in memory. The microprocessor 41 executes processes via the input/output unit 13 for mutual authentication with other counterpart components that transfer data to and from the microprocessor 41. Once mutual authentication has been succeeded, the microprocessor 41 executes time-acquisition routines or time-correction routines (described hereinafter) in accordance with requests input from the counterpart component.

The non-volatile memory 42 is static RAM or the like which can hold stored content even while the electricity source of the information-processing apparatus is turned off. The non-volatile memory 42 holds the time-request source identifier (ID) and the difference information that indicates correction amount in related manner as shown in FIG. 4.

The RTC 43 keeps the time and date, responds to requests from the microprocessor 41, and outputs information having the clocked system time and date to the microprocessor 41. The RTC 43 is also backed up by an built-in battery (not shown), and does not cease keeping time even when the electricity source of the information-processing apparatus is turned off.

The time management unit 17 is configured as described above, and, as will be described hereinafter, carries out processes for mutual authentication with request sources that provide or correct time information. If mutual authentication is successful, the time management unit 17 carries out processes that provide time information or correct time information to be provided, in accordance with requests input from the request source.

A plurality of application programs are executed in the MPU 21 of the control unit 11 in the present embodiment. Those of the applications that request time information are associated with a time-request source identifier. The time-request source identifier may be different for each application, or at least some of the applications may use a common time-request source identifier.

Figure 5:
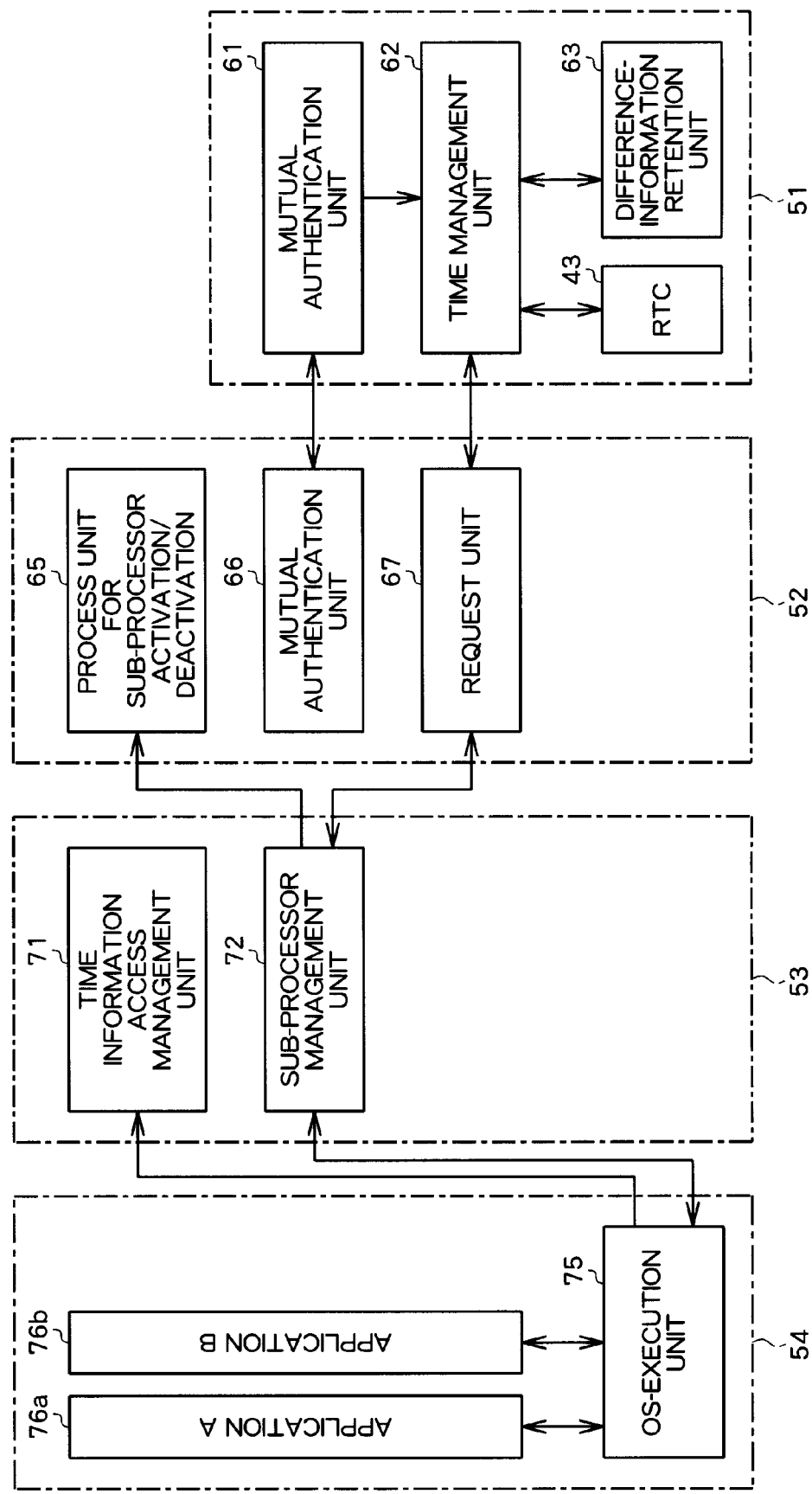
FIG. 5 is a functional block diagram showing an example of the information-processing apparatus according to an embodiment of the present invention.

The functional configuration of the information-processing apparatus according to an embodiment of the present invention will be described next. The information-processing apparatus of the present embodiment functionally has a time-retention unit 51, a time-information acquisition unit 52, a time management process execution unit 53, and an application-execution unit 54, as shown in FIG. 5. The time-retention unit 51 is a unit that manages time information. The time-information acquisition unit 52 is a unit for acquiring or correcting time information. The time management process execution unit 53 is a unit for requesting acquisition or correction of time information. The application-execution unit 54 is a unit for executing or otherwise processing applications that serve as sources of requests related to time information.

In this embodiment the time-retention unit 51, the time-information acquisition unit 52, and the time management process execution unit 53 are implemented by the time management unit 17, the sub-processor unit 24 that operates as a security processor unit, and the MPU 21, respectively, which carry out processes for implementing their respective functions in individual execution spaces and mutually restrict access to internal data related to program execution. A safe method of time correction can be executed according to this aspect, and different time information can be set for each execution space and process using time-request source identifiers.

The time-retention unit 51 in this instance has a mutual authentication unit 61, a time management unit 62, and a difference-information retention part 63. The mutual authentication unit 61 and the time management unit 62 are implemented as software by the microprocessor 41 of the time management unit 17 in the present embodiment. The difference-information retention part 63 is implemented by the non-volatile memory 42.

The mutual authentication unit 61 carries out a process for mutual authentication with the sub-processor unit 24 that operates as the time-information acquisition unit 52. If mutual authentication fails, no subsequent response will be made to requests related to time information input from the time-information acquisition unit 52. Invalid time information replacement and other irregularities can thereby be prevented when there are violations due to hardware replacement or the like. A challenge-response system, for example, or another well-known system may be used as the system for mutual authentication.

When mutual authentication with the sub-processor unit 24 that operates as the time-information acquisition unit 52 is successful, a signal (permission-to-respond signal) indicating that a response should be made to requests from the time-information acquisition unit 52 is output to the time management unit 62 by the mutual authentication unit 61.

The time management unit 62 disregards requests related to time information (requests for acquisition or correction of time information) input from the time-information acquisition unit 52 when a permission-to-respond signal has not been input from the mutual authentication unit 61. The time management unit 62 responds to requests related to time information input from the time-information acquisition unit 52 if a permission-to-respond signal has been input from the mutual authentication unit 61. Predetermined information that acts as an identifier for identifying the request source (the time-request source identifier), as well as the content of the request (in this example, the provision or correction of time information) are input from the time-information acquisition unit 52 in this instance.

The time management unit 62 acquires clocked time information Traw from the RTC 43 and stores the time information Traw in the work memory (a region reserved in the memory built-in the microprocessor 41) if the contents of the request are a request for time information to be provided. The time management unit 62 also: acquires difference information $\Delta Tid$ associated with the time-request source identifier from the non-volatile memory 42, which operates as the difference-information retention unit 63; adds the difference information $\Delta Tid$ to the time information Traw stored in the main memory; obtains the corrected time $T=Traw+\Delta Tid$; and sends the corrected time T to the sub-processor unit 24 that operates as the time-information acquisition unit 52.

If the contents of the request relate to the correction of time information, the time management unit 62 receives the new difference information $\Delta Tid$ input from the time-information acquisition unit 52. The resulting new difference information $\Delta Tid$ is used to overwrite difference information associated with the input time-request source identifier from among the difference information stored in the non-volatile memory 42, which operates as the difference-information retention unit 63.

Information transferred between the sub-processor unit 24 (the time-information acquisition unit 52), which is the request source, and the time management unit 17 (the time-retention unit 51) may be encrypted.

The time-information acquisition unit 52 includes a process unit 65 for sub-processor activation/deactivation, a mutual authentication unit 66, and a request unit 67. The time management process execution unit 53 includes a time information access management unit 71 and a sub-processor management unit 72. The application-execution unit 54 includes an OS-execution unit 75 and one or more application-process execution units 76a, 76b . . . .

The time-information acquisition unit 52 is implemented as software by the sub-processor unit 24 in the present embodiment. The process unit 65 for sub-processor activation/deactivation receives commands from the MPU 21, which operates as the time management process execution unit 53, and activates one of the sub-processor units 24 as a security processor unit.

The secondary processing element 32 of the activated sub-processor unit 24 acquires from the memory unit 12 (encrypted) programs, which implement the functions of the mutual authentication unit 66 and the request unit 67. These programs are authenticated by the secondary processing element 32, and, if authentication is successful, are decrypted by the secondary processing element 32 and stored in the local memory unit 31. The secondary processing element 32 initiates the execution of the stored programs, thereby enabling the functioning of the mutual authentication unit 66 and the request unit 67.

The mutual authentication unit 66 executes the mutual authentication process between the time-retention unit 51 and the mutual authentication unit 61. Once the mutual authentication process has succeeded, a signal indicating successful authentication is output to the request unit 67.

If a signal indicating successful mutual authentication input from the mutual authentication unit 66 is received, the request unit 67 outputs to the time-retention unit 51 the time-request source identifier and the contents of the request, which are input from the time management process execution unit 53. The request unit 67 receives the time information T (the corrected time, which has been corrected according to the difference information corresponding to the time-request source identifier) input from the time-retention unit 51 when a request for acquiring (providing) time information has been output. The request unit 67 outputs the time information T, which is input from the time-retention unit 51, to the time management process execution unit 53.

The time management process execution unit 53 can be implemented as software by the MPU 21. The time management process execution unit 53 executes the program modules for implementing the operation of the time information access management unit 71 and the sub-processor management unit 72 in a state wherein the internal data thereof is inaccessible from applications that the MPU 21 is executing separately (a state wherein access to the allocated memory regions, registers, and the like is prohibited from other applications).

The time information access management unit 71 receives time-request source identifiers and requests related to time information (requests for acquiring or correcting time information) via the operating system from the processes of the applications that are executed in the application-execution unit 54. Instructions indicating that one of the sub-processor units 24 should be activated as a security processor unit and operated as the time-information acquisition unit 52 are then output to the sub-processor management unit 72 by the time information access management unit 71. The time information access management unit 71 also outputs input time-request source identifiers and requests related to time information to the sub-processor management unit 72 along with the aforementioned instructions.

The sub-processor management unit 72 outputs an instruction indicating that one of the sub-processor units 24 that is intended to be activated should be activated. The sub-processor management unit 72 also outputs an instruction to the unit 24 to be activated indicating that a program causing operation as the time-information acquisition unit 52 should be loaded. When the aforementioned sub-processor unit 24 begins operating as the time-information acquisition unit 52, the sub-processor management unit 72 outputs a time-request source identifier and a request related to time information to the activated sub-processor unit 24. When the time information access management unit 71 receives a time-request source identifier, a decision is made as to whether or not the identifier is legitimate. If the identifier is legitimate, instructions are output to the sub-processor management unit 72, whereas if the identifier is not legitimate, a notification denying the acquisition of information is output to the OS.

When the sub-processor management unit 72 has output a request for acquisition of time information as a request related to time information, the time information T input from the time-information acquisition unit 52 (the corrected time, which has been corrected according to the difference information corresponding to the time-request source identifier) will be received. The sub-processor management unit 72 then outputs the input time information T to the process of the application that is the request source.

The OS-execution unit 75 of the application-execution unit 54 is implemented by the execution of operating system programs by the MPU 21. If information is input indicating that an operation to start executing the application has been performed, the OS-execution unit 75 reads the indicated application program from the memory unit 12 (or the external memory unit 14) and starts executing the program. Each of the application-process execution units 76 is implemented by applications executed at this time.

The OS-execution unit 75 operates in the same manner as a general operating system with regard to memory management, scheduling of process execution, and other aspects related to the execution of applications. The OS-execution unit 75 receives time-request source identifiers and requests related to time information from the application processes and then outputs the time-request source identifiers and requests related to time information to the time management process execution unit 53. When time information is received from the time management process execution unit 53, the OS-execution unit 75 also outputs the time information to the application process that is the request source.

The application-process execution units 76 operate in accordance with the application programs. Each application-process execution unit 76 outputs a predetermined time-request source identifier and a request for acquisition of time information to the OS-execution unit 75 when time information is necessary for the process of executing the concerned application program. The acquired time information is received via the OS-execution unit 75. Additionally, each application-process execution unit 76 corrects the difference information associated with the predetermined time-request source identifier and correct the time information during execution of the concerned application program, whereupon a time-correction request having difference information is output together with a time-request source identifier.

The operation of the information-processing apparatus of the present embodiment will be described next. In the present embodiment, the application programs are correlated with the information of the corresponding time-request source identifiers in advance, and are held in the memory unit 12 or the external memory unit 14.

When the information-processing apparatus is first activated, the MPU 21 of the control unit 11 reads the operating system programs from the memory unit 12 and initiates the program execution. Through operation of the operation unit 15, the user also directs the activation of, e.g., a game or other application stored in a DVD-ROM or the like that is loaded onto the external memory unit 14.

The MPU 21, as the process of operating system, responds to instructions for starting applications, copying programs stored in the external memory unit 14 to the memory unit 12, and initiating execution. In this instance, the MPU 21 executes the processes of the game program, which has started to run, in parallel (in a time-sharing manner) with the processes of other applications as a process of the operating system.

Figure 6:
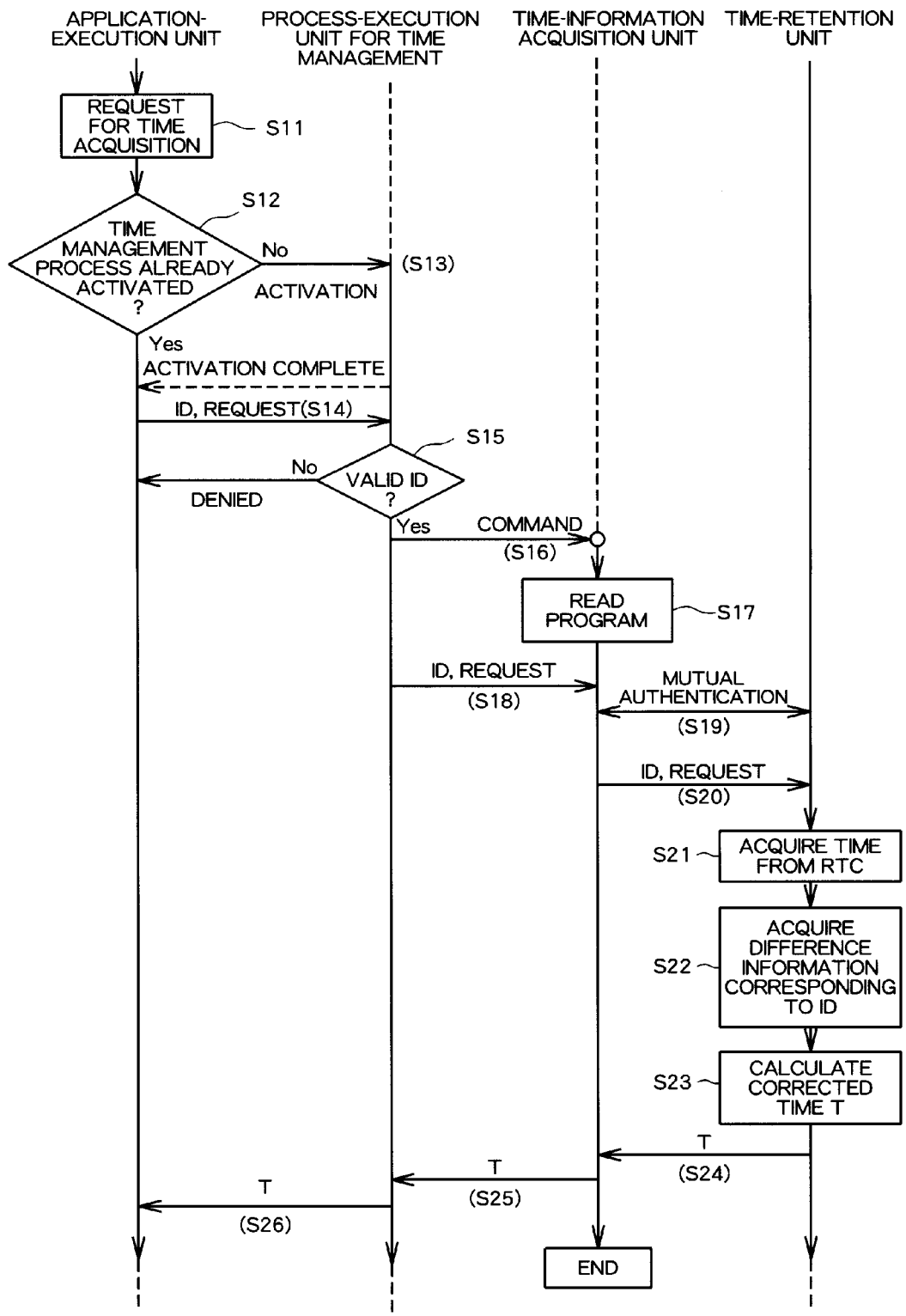
FIG. 6 is a flow chart showing an example of the time-acquisition operation of the information-processing apparatus according to an embodiment of the present invention.

The operation of time acquisition will be described using FIG. 6. The MPU 21 in this case is in the process of executing application programs. If a system call for time acquisition is issued or other instructions requesting the acquisition of time are executed (S11), the MPU 21, as the process of operating system, determines whether or not the program that implements the time management process execution unit 53 is running (S12).

If the program that implements the time management process execution unit 53 is not activated, the MPU 21 loads and activates the program from the memory unit 12 (S13). The program may be stored in an encrypted state in the memory unit 12. In such instances, the operating system of the MPU 21 initiates execution of the program after decrypting the program.

When the program that implements the time management process execution unit 53 is activated in process S12, or after activation has been completed in process S13, the MPU 21 carries out the processes of the time information access management unit 71. In other words, based on instructions executed by the application program in process S11 the MPU 21: holds in the main memory the time-request source identifier (ID), which is associated with the application, and the request for acquisition of time information (S14); and makes a judgment as to whether or not the time-request source identifier is valid. If the time-request source identifier in this instance is not valid, the MPU 21 outputs to the operating system a notification denying the acquisition of time information (S15). If the time-request source identifier is judged to be valid, the MPU 21 activates one of the sub-processor units 24 and outputs a command indicating that operation as the time-information acquisition unit 52 should be performed (S16).

The sub-processor unit 24 that receives the input of this command is activated and reads from the memory unit 12 to the local memory unit 31 the programs stored in the memory unit 12 that are related to the time-information acquisition unit 52. The activated sub-processor unit 24 uses a predetermined authentication/decryption key to authenticate the (encrypted) programs read from the memory unit 12. If authentication is successful, the programs are decrypted and stored in the local memory unit 31 (S17).

If the sub-processor unit 24 is so activated as a security processor unit, the MPU 21 outputs the time-request source identifier and the request for acquisition of time information, which are held in the main memory, to the activated sub-processor unit 24 as a process of the time management process execution unit 53 (S18).

The secondary processing element 32 of the sub-processor unit 24 initiates the execution of the programs stored in the local memory unit 31 and requests mutual authentication from the time management unit 17 (S19). The mutual authentication process is executed in accordance with programs stored in the memory built into the microprocessor 41 of the time management unit 17, for example. If mutual authentication is successful, the time-request source identifier and the request for acquisition of time information received from the MPU 21 are sent to the microprocessor 41 (S20). Since the control unit 11 and the time management unit 17 are implemented as different hardware components in this example, the time-request source identifier and the request for acquisition of time information are output away from the control unit 11 package. This information may be encrypted in order to prevent leakage of the information. Information transferred between the control unit 11 and the time management unit 17 during mutual authentication in process S17 may also be encrypted.

The microprocessor 41 of the time management unit 17 acquires the time information Traw kept by the RTC 43 (S21) and stores that information in the main memory (a region reserved in the memory built-in the microprocessor 41). The microprocessor 41 also acquires the difference information ΔTid that is stored in the non-volatile memory 42, in association with the time-request source identifier input from the sub-processor unit 24 (S22). The microprocessor 41 further adds the difference information ΔTid to the time information Traw stored in the main memory and calculates the corrected time T=Traw+ΔTid (S23). The microprocessor 41 then outputs the calculated corrected time T to the sub-processor unit 24 operating as the time-information acquisition unit 52 (S24). The corrected time T may be encrypted and output to the sub-processor unit 24 of the control unit 11.

The sub-processor unit 24 outputs information having the corrected time T to the program that implements the time management process execution unit 53 of the MPU 21 (S25). The time management process execution unit 53 in the MPU 21 outputs the information having the corrected time T to the application program that is the request source (S26).

After this process, the processes of the sub-processor unit 24 that operates as the time-information acquisition unit 52 may be ended, the contents of the local memory unit 31 may be initialized or erased, and program execution may be ceased.

Figure 7:
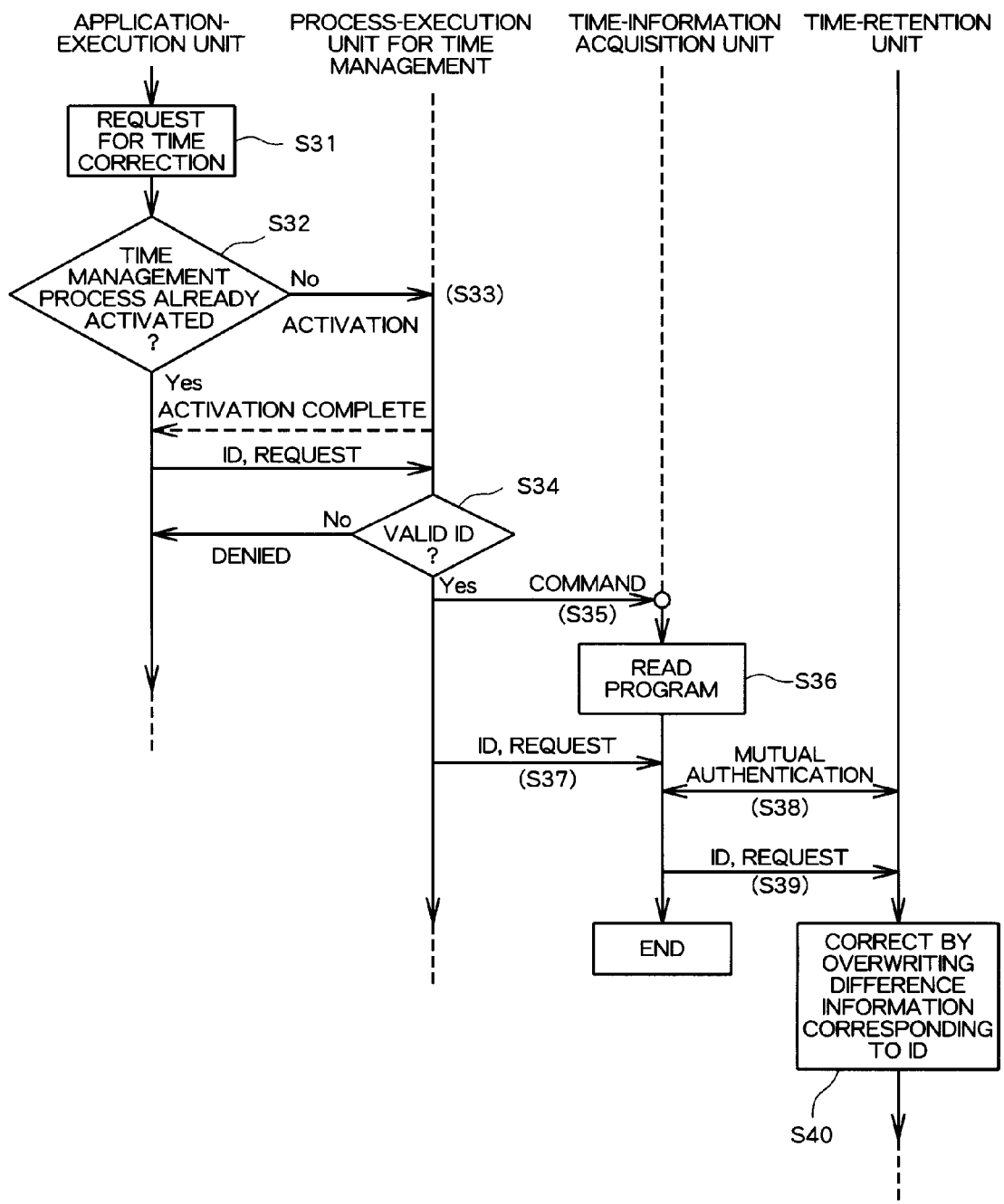
FIG. 7 is a flow chart showing an example of the time-correction operation of the information-processing apparatus according to an embodiment of the present invention.

The time correction operation will be described using FIG. 7. The MPU 21 will be in the process of executing application programs. If a system call for time correction is issued or other commands requesting the correction of time are executed (S31), the MPU 21, acting as the operating system, determines whether or not the program that implements the time management process execution unit 53 is activated (S32).

If the program that implements the time management process execution unit 53 is not activated, the MPU 21 loads and activates the program from the memory unit 12 (S33). The program may be encrypted and stored in the memory unit 12. In such instances, the operating system of the MPU 21 initiates execution of the program after decrypting the program.

When the program that implements the time management process execution unit 53 is activated in process S32, or after activation has been completed in process S33, the MPU 21 carries out the processes of the time management process execution unit 53. In other words, based on instructions executed by the application program in S31, the MPU 21: holds in the main memory the time-request source identifier (ID) associated with the application, the post-correction (new) difference information, and the request for correction of time information; and makes a judgment as to whether or not the time-request source identifier is valid. If the time-request source identifier in this instance is not valid, a notification denying the correction of time information is output to the operating system (S34). If the time-request source identifier is judged to be valid, the MPU 21 activates one of the sub-processor units 24 and outputs a command indicating that operation as the time-information acquisition unit 52 is to be performed (S35).

The sub-processor unit 24 that receives this command is activated, and reads from the memory unit 12 the programs stored in the memory unit 12 that are related to the time-information acquisition unit 52. The sub-processor unit 24 uses a predetermined authentication/decryption key to authenticate the (encrypted) programs read from the memory unit 12. If authentication is successful, the programs are decrypted and stored in the local memory unit 31 by the sub-processor unit 24 (S36).

When the sub-processor unit 24 is activated, the MPU 21 outputs the time-request source identifier, the post-correction (new) difference information, and the request for correction of time information, which are held in the main memory, to the activated sub-processor unit 24 as a process of the time management process execution unit 53 (S37).

The secondary processing element 32 of the sub-processor unit 24 initiates the execution of the programs stored in the local memory unit 31 and requests mutual authentication from the time management unit 17 (S38). In this instance, the mutual authentication process is executed in accordance with programs stored in the memory built into the microprocessor 41 of the time management unit 17. If mutual authentication is successful, the time-request source identifier, the post-correction (new) difference information, and the request for correction of time information received from the MPU 21 are sent to the microprocessor 41 (S39). Since the control unit 11 and the time management unit 17 are implemented as different hardware components in this instance, the time-request source identifier, the difference information, and the request for acquisition of time information are output away from the control unit 11 package. This information may be encrypted in order to prevent leakage thereof. Information transferred between the control unit 11 and the time management unit 17 during mutual authentication in process S37 may also be encrypted.

The microprocessor 41 of the time management unit 17 uses the received (new) difference information to overwrite difference information stored in the non-volatile memory 42, in association with the time-request source identifier received from the sub-processor unit 24 (S40).

After this process, the processes of the sub-processor unit 24 that operate as the time-information acquisition unit 52 may be ended, the contents of the local memory unit 31 may be initialized or erased, and program execution may be ceased.

According to the present embodiment, time information can be provided that is different for each time-request source identifier by using time-request source identifiers and difference information related thereto. Additionally, the processes of the time-retention unit 51, the time-information acquisition unit 52, and the time management process execution unit 53, which execute, respectively, the requesting, acquisition, and management of time information are processed separately in respective and individual execution spaces, whereby a safe method of acquiring and correcting time can be executed.

In the preceding description, difference information was recorded in association with a time-request source identifier, and the calculation for time correction was carried out by adding together the time kept by the RTC and the difference information associated with a time-request source identifier according to the request source, but the calculation for time correction is not limited thereto. Correction may also be carried out using ratios, combinations of ratios and differences, or other functions and constants. Information having these correction parameters is held in association with the time-request source identifier instead of difference information in such instances.

Additionally, an example having only one operating system was described herein, but the present invention is not limited thereto; a plurality of operating systems may be used. In such instances, different time information can be set for each of the operating systems if a time-request source identifier is allocated for each operating system.

Further, in the description of the present embodiment, an example was given wherein the post-correction (new) time information that is provided by the time-retention unit 51 is provided to the request source in the application-execution unit 54 via the time-information acquisition unit 52 and the time management process execution unit 53. However, the method for providing time information is not limited thereto. A variety of methods may be employed; e.g., storing the post-correction (new) time information in a prescribed storage region of the memory unit 12 and having the request source reference the storage region.

While the present invention is described in terms of preferred or exemplary embodiments, it is not limited thereto.

What is claimed is:

1. An information-processing apparatus comprising:
  a time-retention unit for managing time information as well as acquiring and providing clocked time information in accordance with a request;
  a time-information acquisition unit for receiving a request for acquiring time information, outputting the request to the time-retention unit, and acquiring and outputting provided time information, the time-information acquisition unit acquires time information by executing a program stored in an associated memory; and
  a time-information request unit for outputting a request for acquiring time information to the time-acquisition unit in accordance with a request from a request source, acquiring time information output by the time-acquisition unit, and providing the acquired time information to the request source, wherein
  the time-retention unit, the time-information acquisition unit, and the time-information request unit are implemented in separated execution spaces wherein each of the separated execution spaces comprise a processor and a memory associated with the processor for carrying out respective functions, and data is exchanged between at least the time-retention unit and the time-information acquisition unit only upon mutual authentication between respective execution spaces.

2. The information-processing apparatus according to claim 1, wherein
  the clocked time information is established as reference time information, and the time retention unit holds difference information pertaining to the difference with respect to the reference time information for each instance of a predetermined identifier;
  when a request for time information is made, time information to be provided is calculated based on the reference time information and the difference information associated with the identifier that is acquired from the source of the request; and
  time information acquired from the result of the calculation is provided.

3. A method for processing time information in an information-processing apparatus by using a computer having process elements that have mutually inaccessible internal data and are capable of providing a first, a second, and a third execution space to execute steps comprising:
  executing a process in the first execution space comprising a first processor and an associated memory for managing time information and acquiring and providing clocked time information in accordance with a request;
  executing a process in the second execution space comprising a second processor and a memory associated with the second processor, for receiving a request for acquisition of time information, outputting the request to the process that is executed in the first execution space, and acquiring time information via executing a program stored in the memory associated with the second processor and outputting the time information provided from said process in the second execution space; and
  executing a process in the third execution space for outputting a request for acquisition of time information in accordance with a request from a request source to the process that is executed in the second execution space, acquiring time information output by said process, and providing the acquired time information to the request source; and facilitating mutual authentication between the time information management process in the first execution space and the time information acquisition process in the second execution space prior to exchange of time information between the first execution space and the second execution space.

4. A computer readable medium with instructions for processing time information within three separate execution spaces, the instructions are operable for:

managing clocked time information and providing the time information in accordance with a request in a first execution space;

receiving a request for acquisition of time information in a second execution space, outputting the request to the first execution space, and acquiring and outputting time information provided from the first execution space, in the second execution space by executing a program stored in the second execution space; and outputting a request for acquisition of time information in accordance with a request from a request source to the second execution space, acquiring time information output by the second execution space, and providing the acquired time information to the request source in a third execution space, wherein the first, and the second execution spaces each comprise a processor and a memory local to the processor; and facilitating mutual authentication between the first execution space and the second execution space prior to mutual exchange of time information between the first execution space and the second execution space.

5. The time information processing method of claim 3, further comprising executing time-acquisition routines or time-correction routines by the first processor comprised within the first execution space in accordance with requests input from a counterpart component.

6. The time information processing method of claim 3, further comprising storing a time-request source identifier (ID) associated with the request source and difference information that indicates correction amount in related manner in the associated memory comprised within the first execution space.

7. The time information processing method of claim 6, further comprising receiving the request source identifier (ID) from the request source which is an application program being executed in the third execution space.

8. The time information processing method of claim 3, wherein the second execution space operates as a security processor unit limiting access to the second execution space from other units.

9. The information processing method of claim 3, further comprising storing key information within the second execution space for facilitating encryption of data transmitted by the request source.

10. The information processing apparatus of claim 1, wherein each of the time-retention unit and the time-information acquisition unit comprises a mutual authentication unit for facilitating the mutual authentication.

11. The information processing apparatus of claim 1, wherein a processor associated with an execution space implementing the time-information acquisition unit acts as a security processor limiting access to the execution space of the time-information acquisition unit by other units.

* * * * *